INVENTOR.
GLEN B. MORRIS
BY Richard W. Anderson
AGENT

INVENTOR.
GLEN B. MORRIS
BY Richard W. Anderson
AGENT

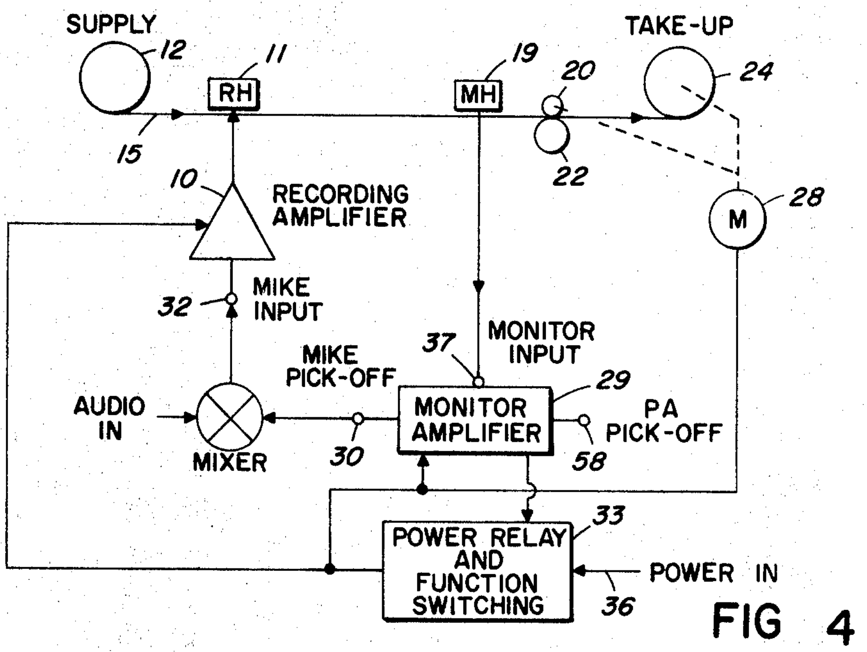
FIG 4
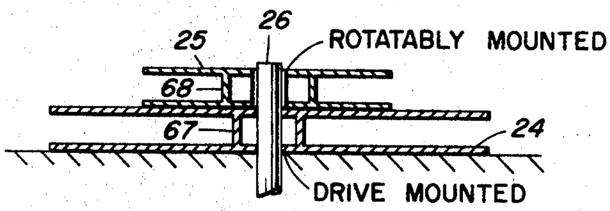
FIG 5
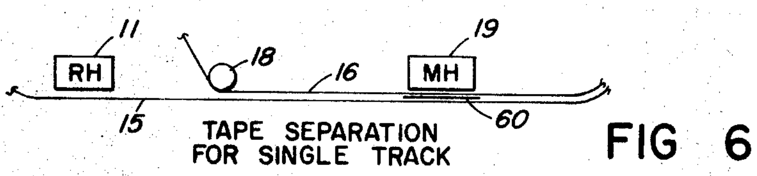
FIG 6
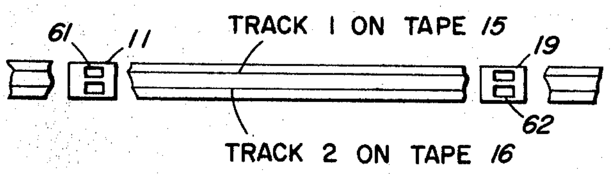
FIG 7 TAPE SEPARATION
INVENTOR.
GLEN B. MORRIS
BY
Richard W. Anderson
AGENT

3,519,762
TAPE DUPLICATOR WITH MASTER AND COPY TAPES DRIVEN BY SAME SPINDLE AND CAPSTAN MEANS

Glen B. Morris, Rural Marion, Iowa, assignor to Collins Radio Company, Cedar Rapids, Iowa, a corporation of Iowa Filed Sept. 25, 1967, Ser. No. 670,109
Int. Cl. G11b 5/86, 15/28; B65h 17/20
U.S. Cl. 179—100.2 1 Claim

ABSTRACT OF THE DISCLOSURE

A basic tape recording apparatus may be modified to increase the system versatility. A second recording head is mounted between the normal recording head and the tape drive capstan. A monitoring amplifier including a voice operated relay arrangement is connected to the second head. Power control and switching circuitry is provided and so interwired with the normal power control of the tape recorder that the basic system may operate normally, may be used to directly copy from one tape to another by advancing both tapes by means of the common capstan, may be used as a monitoring device with a provision for automatic shut down in the event of recording malfunction, and may operate as a unique echo generator.

This invention relates generally to the art of magnetic tape recording and more particularly to the provision of a versatile monitoring and function switching apparatus which may be designed into a tape recording apparatus or, alternatively, added to a basic tape recording arrangement by a minimal modification.

The monitoring and function switching arrangement of the present invention permits, by a relatively simple addition to a basic tape recording system, the copying of program material from one tape to a second tape by means of a common capstan drive with provisions which uniquely assure proper tension on both tapes with properly damped dual supply feeds and proper take-up action on dual take-up reels.

A further object of the present invention is the provision of means to directly monitor recorded material being placed on a tape with provision for automatic recording shut-off should, for some reason, the normal recording function be faulty due to tape quality, dirt on the tape, or other factors which prevent program material from being properly transferred.

A still further object of the present invention is the provision for a relatively simple modification or addition to a standard tape recording apparatus by means of which the apparatus may function in the manner of an echo generator, whereby an audio sound may be repeatedly recorded at fixed time intervals with progressively diminished audibility.

A still further object of the present invention is the provision of means permitting a basic tape recording apparatus to function as a voice operated device with provisions for adjustable sensitivity and delay such that the recording apparatus may be automatically turned on to record, and be turned off, in response to an audible input of selected level and continuity.

The present invention is featured in the provision of the addition of a second tape head to a basic tape recording arrangement. The tape head is mounted between the standard recording head of the apparatus and the capstan drive. A monitoring amplifier is responsive to audio pick-up from the additional head to control a power relay and function switching arrangement by means of which the aforementioned objects may be accomplished.

These and other features and objects of the present invention will become apparent upon reading the following description with reference to the accompanying drawings in which:

FIG. 4 is a functional diagram of the apparatus as employed in a still further operating mode;

FIG. 5 illustrates a mechanical detail of first and second take-up tape reels in conjunction with the tape recorder take-up drive spindle;

FIG. 6 is a functional representation of a first arrangement for maintaining separation between first and second tape recording tracks as employed in the present invention; and FIG. 7 is a diagrammatic representation of a further expedient for preventing cross talk in tape copying by means of recording track separation.

The present invention has been implemented as an addition to a basic tape recording arrangement. In this regard, the invention is essentially the addition of a second recording head (hereinafter referred to as a monitoring head) and a monitoring amplifier and power relay and function switching arrangement to a basic tape recorder. A basic tape recording apparatus shall here be regarded as including a recording amplifier having a microphone input provision, a recording head, a supply tape reel, a capstan drive arrangement, a tape take-up reel, and a motor for driving the capstan and the take-up reel to draw the tape across the recording head.

The present invention adds a second head (the monitoring head), an audio amplifier which receives the output from the second head, a voice-operated relay drive and control circuit, and certain function switching. The voice-operated relay arrangement and function switching are interwired with the normal power supply controls of the recorder such that power to the drive motor and recording amplifier may be selectively applied.

Figure 2:
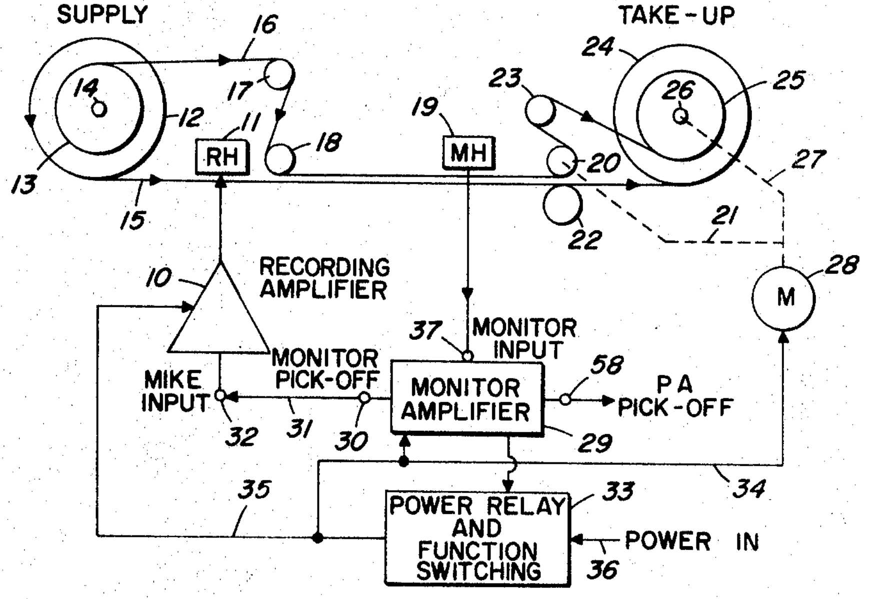
FIG. 2 is a functional diagram depicting operation of the recording apparatus in a first operating mode.

The invention will first be considered in conjunction with the functional diagram of FIG. 2 which illustrates the interrelationship between the standard tape recording apparatus and the monitoring and function switching apparatus in accordance with the invention. FIG. 2 additionally illustrates a first operational mode to permit copying from one tape directly to another using only a single basic tape recorder.

With reference to FIG. 2, a tape 15 is carried on a supply reel 12 across recording head 11, through a capstan drive and idler 20–22, and onto a take-up reel 24. A recording amplifier 10 is connected to the recording head. The recording amplifier 10 is provided with a microphone input jack 32. A tape drive motor 28 rotates a capstan 20 through mechanical linkage 21 and additionally drives the spindle 26 for take-up reel 24 through mechanical linkage 27. The arrangement thus far described is that of a basic tape recorder.

In accordance with the present invention, a second tape head or monitoring head 19 is mounted between the standard recording head 11 and the capstan drive 20. The monitoring head 19 is connected to a monitor amplifier 29 through an input terminal 37. The power source 36 is applied through a power relay and function switching arrangement 33 which, as will be further described, selectively supplies power through lines 35 and 34 to the recording amplifier 10 as well as to the monitor amplifier and the tape drive motor 28.

Monitoring amplifier 29 is provided with a first audio signal pick-off terminal 30. The program material picked up by monitoring head 19 may be applied through line 31 to the microphone input jack 32 of the recording amplifier 10. The monitor amplifier 29 is additionally provided with a second audio pick-off terminal 58 to which an external audio amplifier or earphones might be connected to permit aural monitoring of the program material picked up by monitoring head 19. Monitor amplifier 29 includes a voice operated relay arrangement from which a control interconnection with the power relay and function switching circuitry 33 permits selective turn-off of power to the recording apparatus when program material is not picked up by monitoring head 19.

The invention will now first be functionally described in terms of various operating modes made possible by the addition of the monitoring head, monitor amplifier and power relay and function switching circuitry to the basic recording apparatus. Detailed description will follow of the electronics by means of which the monitor amplifier and the power relay and function switching circuitries implement the functions and operating modes.

FIG. 2 illustrates an operating mode by means of which recorded material on a first tape may be directly recorded onto a second tape. In this mode, first and second supply tape reels 12 and 13 are employed, and recorded material on tape 16 from supply reel 13 is to be copied onto tape 15 from supply reel 12. Reels 12 and 13 are rotatably mounted on a common supply reel spindle 14, one on top of the other. Tape 16 from reel 13 is carried over guide posts 17 and 18, across the monitoring head 19, through the capstan drive 20–22, and around a further guide post 23 onto a first take-up reel 25. A clean tape 15 from supply reel 12 is carried across recording head 11, through the capstan drive arrangement 20–22 in common with tape 16, and onto a second take-up reel 24. Tape 16 carries the programmed material to be copied onto tape 15. Tapes 15 and 16 are withdrawn from their respective supply reels when advanced through the common capstan drive arrangement 20–22.

As more clearly illustrated in FIG. 5, tape 15 is taken up by reel 24 which is drive mounted to the take-up drive spindle 26. Although not shown in detail, this drive mount may be conventionally implemented by means of a splined shaft and cooperating hub arrangement. Tape 16 is taken up on reel 25 which is placed over reel 24 and rotatably mounted (not drive-mounted) with respect to the take-up spindle 26. Drive motion is then imparted to the top reel 25 through frictional engagement with the driven wheel 24. Proper take-up tension on both tapes may be assured by choosing the lower reel 24 to have a smaller hub 59 than the hub 58 of the top reel 25. As illustrated in FIG. 5, for each complete revolution of the reels 24 and 25, a lesser footage of tape 15 is wound upon reel 24 than that of tape 16 on reel 25. Thus, a slipping action is effected betewen the two reels which is inherently self-adjustable so that each of the tapes is wound upon its respective reel with no problem of undue slack in the take-up arrangement due to improper tape tension.

Proper withdrawal of the tapes from their respective supply reels 12 and 14 is likewise efficiently accomplished due to a damping action as concerns rotation of the supply reels which are in frictional engagement with one another. Note, with references to FIG. 1, that tape 16 is withdrawn from supply reel 13 in a "clockwise" direction, while tape 15 is withdrawn from reel 12 in a "counterclockwise" direction. Rotation of either of the supply reels 12 and 13 thus imparts a retarding or braking action against the other of the reels due to the friction between the two reels. The tapes 15 and 16 are thus withdrawn from their respective reels, each at its demanded rate without mutual interaction which would cause excessive tension in either of the tapes or too rapid a feed from either of the tapes which would result in undesirable slack.

In operation, program material pre-recorded on tape 16 is picked up by monitor head 19, amplified in an audio amplifier section of the monitor amplifier 29 and coupled through line 31 from the moitoring amplifier to the microphone input jack 32 of the recording amplifier. The program material thus received by the recording amplifier is recorded onto tape 15 by means of recording head 11.

The arrangement of FIG. 2 permits copying of one tape onto another employing but a single tape recorder modified in accordance with the present invention. For this function, the basic tape recorder requires only the addition of a second monitoring head 19, a monitoring amplifier along with appropriate tape guide posts and slight modification of the supply and take-up reel spindles—lengthening the supply reel spindle to accommodate a second reel and extending the take-up spindle 26 to permit a rotatable mounting of a second take-up reel 25 thereon with only the low take-up reel 24 being directly driven by the take-up spindle.

Since the monitoring head 19 is picking up the material to be copied, the voice operated relay automatic shut-off function is not effective in the tape copying operating mode of FIG. 2. Some means, however, should preferably be incorporated to prevent cross talk in the recording arrangement. Since monitor head 19 is picking up the pre-recorded material on tape 16 and recording it on tape 15 by means of recording head 11, both tapes have recorded thereon program material as they pass monitoring head 19. It is noted, however, that tape 16, from which material is to be copied, is juxtaposed with monitoring head 19. Should single track recording heads 11 and 19 be employed, provisions to prevent monitor head 19 from picking up the copied program material on tape 15 may be accomplished as illustrated functionally in FIG. 6, by means of inserting a divider 60 of monomagnetic material, such as a piece of plastic or paper, between the tapes 15 and 16 such that a space separation between tape 15 and monitoring head 19 is maintained. Should recording head 11 and monitoring head 19 be multitrack devices, the problem of cross talk may be more simply effected by employing a track separation technique as illustrated functionally in FIG. 7. In this case a top pick-up 61 on recording head 11 may be employed and a bottom pick-up 62 on monitoring head 19. By this arrangement information recorded on "track 2" of tape 16 may be recorded onto "track 1" of tape 15 to eliminate the problem of cross-talk which might otherwise be introduced at monitoring head 19.

Figure 3:
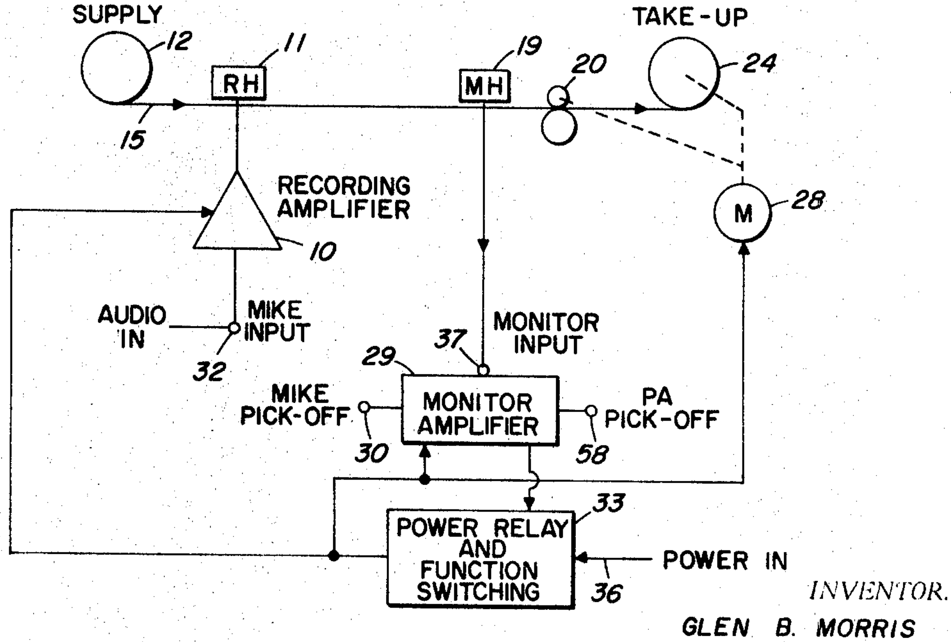
FIG. 3 is a functional diagram of the operation of the apparatus in a further operating mode.

A second operating mode is depicted functionally in FIG. 3 wherein the voice operated relay section of the monitoring amplifier 39 is employed. The arrangement of FIG. 3 permits monitoring of program material as it is being recorded on a tape by means of recording head 11 to effect an automatic shut-down of the recording apparatus if program material is not being properly recorded. Standard tape recording devices employ recording level monitors, such as meters, to indicate the signal level being applied to the recording head 11. This type of monitor does not indicate that the information is, in fact, being properly recorded, if at all, onto the tape. Thus, in the operating mode depicted in FIG. 3, an audio input to the microphone input jack 32 of recording amplifier 10 is recorded onto tape 15 by means of recording head 11. The recorded material is subsequently picked up by monitoring head 19 and applied to the monitor amplifier 29. A second audio pick-off 58 from monitor amplifier 29 may be used to operate a headset or other reproducing device to permit aural monitoring of that which is actually being recorded onto the tape. In addition, as will be more fully described, the monitor amplifier includes a voice operated relay arrangement to monitor the level of the information actually recorded onto the tape. Should the recorded level fall below a selected threshold, the voice operated relay circuitry, through interconnection with power relay and function switching arrangement 33, shuts down power to the recorder. This same voice operated relay switching arrangement may be additionally utilized to operate a warning light or buzzer, as at some remote location.

Since the operating mode of FIG. 3 employs a voice operated relay function, the monitoring amplifier 29, as will be further described, employs an arrangement for selecting threshold sensitivities and shut-down delays to permit the entire recording operation to be voice operated, energizing the recording equipment and initiating the recording action only in response to a sustained audio input to recording amplifier 10.

A further operating mode is depicted functionally in FIGURE 4. Program material picked up from tape 15 by monitoring head 19 is taken from the audio amplifier pick-off jack 30 of monitor amplifier 29 and mixed with an audio input signal prior to application to microphone input jack 32 of recording amplifier 10. The arrangement of FIGURE 4 enables the apparatus to function as a unique "echo generator." A word or phrase applied to the mixer from a microphone or other source is recorded onto tape 15 by recording head 11, picked up a discrete time interval later by monitoring head 19, applied through the amplifying section of monitor amplifier 29 and back to the mixer. As a result, a word or phrase is sequentially recorded at equal time intervals determined by the time of tape travel between the recording head 11 and monitoring head 19, with each subsequent recording diminishing in intensity due to the inherent amplifier losses. In a constructed embodiment employing the function of FIGURE 4, up to twenty-one clear and distinct repeats of an input word or phrase was obtained. The arrangement of FIGURE 4 thus permits the device to operate as an echo generator by means of which novel audio material can be generated onto a tape.

Figure 1:
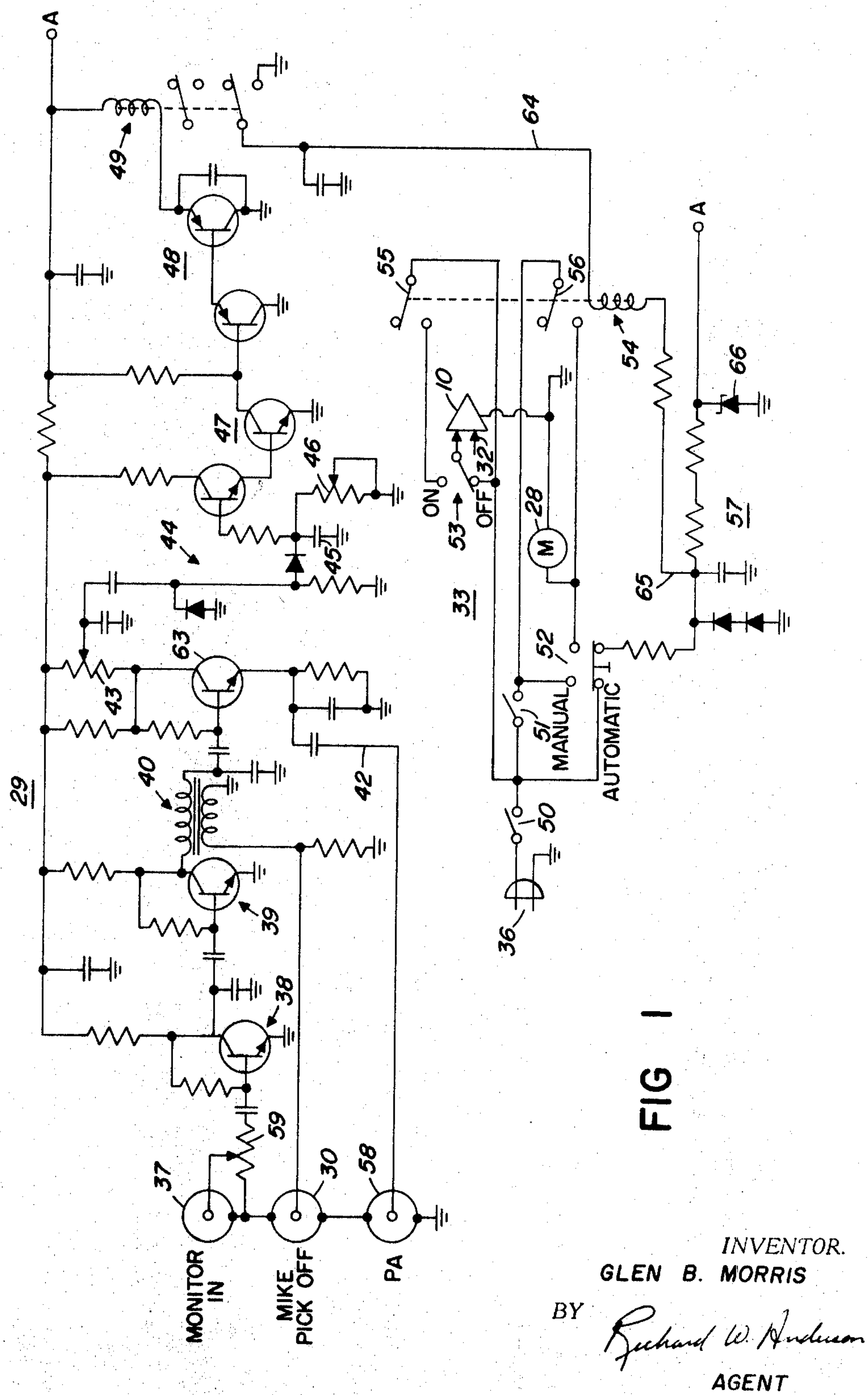
FIG. 1 is a schematic diagram of the monitoring and function switching arrangement in accordance with the present invention.

The means by which the above described operating modes are implemented will become apparent upon considering the schematic diagram of FIG. 1. The monitor amplifier 29 is shown in complete schematic in FIGURE 1. The power relay and function switching arrangement 33 is shown schematically along with its relationship with the drive motor 28, recording amplifier 10 and the normal power on/off switch 50 and motor "end of tape" switch 51. Motor 28, amplifier 10, and switches 50 and 51 would normally be incorporated in a basic recorder arrangement. The additional relay and function switching is wired in a cooperating interrelationship with the normal control function.

Transistors 38, 39, and 63 comprise the audio amplifier portion of the monitor amplifier 29. The monitor input jack 37, which is connected to the monitoring head 19 of FIGURES 2, 3, and 4, is connected to potentiometer 59 for the purpose of selecting an input level for distortion control for various audio inputs to jack 37. The audio input signal applied to jack 37 is amplified in the transistor stages 38 and 39. The collector output from transistor 39 is applied to the primary of transformer 40 the secondary winding of which is connected to microphone pick-off jack 30 of the monitor amplifier.

Jack 30 is connected to the microphone input 32 of the recorder amplifier 10 for the operating modes depicted in FIGURES 2 and 4. The audio signal is additionally applied to a further transistor amplifier stage 63 the emitter output of which is coupled through line 42 to the power amplifier pick-off jack 58 which, as previously discussed, may be connected to an external amplifier or head set to permit aural monitoring. The collector of transistor 63 is returned to the power source A through potentiometer 43. The wiper-arm of potentiometer 43 is coupled to a rectifying arrangement 44 the output of which appears across a capacitor 45. The selective adjustment of the wiper arm of potentiometer 43 establishes a charging rate for capacitor 45. The voltage across capacitor 45 is applied as input to a threshold sensitive amplifier 47. Thus, the charging rate of capacitor 45 determines a time delay in the operation of the threshold amplifier 47. Potentiometer 43 thus functions as a sensitivity control for the operation of amplifier 47 which functions as a voice controlled switching arrangement. The output from threshold sensitive amplifier 47 is coupled through a further amplifying stage 48 which includes an output transistor the emitter of which is coupled through the energization coil of a relay 49 to the power source A. Capacitor 45 charges in the presence of audio input to the monitor amplifier at a rate determined by the setting of potentiometer 43.

A large adjustable resistance 46 shunts capacitor 45. The adjustment of resistor 46 determines the rate at which the charge on capacitor 45 is allowed to bleed off, and thus resistor 46 is effective in setting the maximum delay time, in the absence of further audio input signal, between the de-energization of threshold sensitive amplifier 47 and the time at which it was caused to fire.

In a constructed embodiment, by an adjustment which established maximum circuit resistance of resistor 46, a delay of up to two minutes was experienced.

In the presence of a predetermined threshold of audio input to jack 37, relay 49 is energized. When energized, relay 49 grounds line 64. This action is instrumental in providing an automatic power shut-off due to an interconnection with the power relay and function switching arrangement generally designated by reference numeral 33 in FIG. 1.

The function switching arrangement is comprised of a first standard power on/off switch 50 to which a source of line power 36 is applied. The fixed contact of switch 50 is connected to the lower contact of a monitor on/off switch 53, to the wiper arm 55 of a power relay 54, and to a contact of a manual-automatic switch 52. Switch 52 is essentially a double-pole, double-throw switch arrangement, permitting interconnection between the upper set of contacts in one position and between the lower set of contacts in the other position.

With the switch 50 in the lower position as illustrated, the input power source 36 is connected to a power supply 57 to develop an output DC voltage A which serves to power the monitor amplifier 29. The DC voltage A is regulated by the incorporation of Zener diode 66. An unregulated DC voltage is taken on line 65 to the winding of the power relay 54. Power source 36 is additionally connected through on/off switch 50 when closed and through a further switch 51 to a second movable contact 56 of the power relay 54. Switch 51 would comprise the standard "motor end of tape switch" associated with tape recording apparatus by means of which the tape drive motor is deenergized when the end of the tape clears the end of the tape switch. The recorder amplifier 10 is connected to the wiper arm of the switch 53 so as to be powered with switch 53 in the off position directly from the input source, and, with switch 53 in the "on" position, the recording amplifier 10 is powered through relay contact 55 when power relay 54 is energized. Further, motor 28 is powered through relay contact 56 when power relay 54 is energized and is alternatively powered when the manual-automatic switch 52 is in the manual or upper position.

The manual-automatic switch 52, when placed in the manual position, applies input power 36 to the motor 28 and recorder amplifier 10. In manual position of switch 52, the monitor power supply 57 is deactivated and thus the monitor portion is rendered inactive and the tape recorder operates in a standard fashion. With the manual-automatic switch 52 in the automatic position as illustrated, the motor 28 is powered only when the power relay 54 is energized by the selected threshold of the threshold sensitivity amplifier 47 being realized, since power relay 54 at that time is provided with a ground return. Recording amplifier 10 is powered in the automatic position of switch 52 only when the monitor on-off switch 53 is in "on" position and the power relay 54 is energized.

The manual-automatic switch 52 might preferably incorporate a momentary "make" function as concerns the upper set of contacts (the manual position) as well as a locked position in manual. This provision is utilized during automatic monitoring operating modes to momentarily energize motor 28 to advance the tape should the system be rendered inactive in a position where programmed material is not being received on the the monitor head 19. In other words, when automatic monitoring operating modes are used, switch 52 may be placed momentarily in manual position to start the motor 28 and advance the tape across the monitor head 19 such that the audio pick-up on head 19 may be applied through the monitor to activate the voice controlled relay 49. Once the audio threshold has activated voice control relay 49, relay 54 is energized to maintain the application of power to the motor and the recording amplifier so long as the threshold of the audio programming on the tape is sufficient to keep the voice controlled relay 49 energized. Thus, switch 52 might be momentarily placed in a manual position at the initiation of the operating modes employing automatic monitoring and power shut-off. An unusual pause in audio program material might cause automatic shut down in which case switch 52 could be momentarily switched to manual to reinstate the automatic function.

Although this invention has been described with respect to a particular embodiment thereof it is not to be so limited as changes might be made therein which fall within the scope of the invention as defined in the appended claims.

I claim:

1. In a tape recording apparatus of a type comprising a first supply tape reel, a first take-up reel, a recording head means past which said first tape is passed from said supply reel to said take-up reel, a tape advance capstan operatively receiving said tape, a motor means for driving said capstan to effect an advance of said tape past said recording head means, a recording amplifier the output of which is connected to said recording head, a microphone input terminal connected to the input of said recording amplifier and a power source for driving said motor and energizing said amplifier; monitoring means comprising a further monitoring head positioned in proximity with said tape path between said recording head and said tape advance capstan, said monitoring means further comprising audio signal amplifying means receiving the output from said monitoring head, said monitoring means further comprising a first audio signal output terminal connected to the audio amplifier of said monitor means, a second tape supply reel, a second tape takeup reel receiving said second tape, said second tape being advanced past and monitoring head and through said tape advance capstan in common with said first tape to said second take-up reel, said second tape being adjacent said monitoring head, means for maintaining a space separation between the recording track on said first tape and the transducer of said monitoring head, said microphone input terminal being connected to said first audio signal output terminal of said monitoring means audio amplifier, said motor driving said capstan to effect a like advance of each of said first and second tapes between their respective supply and take-up reels whereby prerecorded audio signal in said second tape is directly copied to said first tape, said second tape supply reel being rotatively mounted on a common spindle with said first tape supply reel, said first and second tapes being withdrawn from their respective supply reels to effect respectively opposite rotations of said supply reels, said first tape take-up reel being drive-mounted on a take-up drive spindle operatively rotated by said motor, said second take-up reel being rotatively mounted on said take-up drive spindle over said first reel and in frictional engagement therewith.

References Cited

UNITED STATES PATENTS

| | | | |
|---|---|---|---|
| 2,774,056 | 12/1956 | Stafford et al. ------ | 179—100.2 |
| 3,444,330 | 5/1969 | Battle ------------ | 179—100.2 |

OTHER REFERENCES

High Fidelity Magazine, June 1963, pp. 10 and 11 (Bell ad).

TERRELL W. FEARS, Primary Examiner

J. R. GOUDEAU, Assistant Examiner

U.S. Cl. X.R.

242—193